(12) United States Patent
Storbeck et al.

(10) Patent No.: US 7,833,576 B2
(45) Date of Patent: Nov. 16, 2010

(54) USE OF SELF-ADHESIVE MATERIALS HAVING ANISOTROPIC PROPERTIES FOR PRODUCING STAMPING PRODUCTS

(75) Inventors: Reinhard Storbeck, Hamburg (DE); Renke Bargmann, Hamburg (DE); Marc Husemann, Hamburg (DE)

(73) Assignee: tesa SE, Hamburg (DE)

( * ) Notice: Subject to any disclaimer, the term of this patent is extended or adjusted under 35 U.S.C. 154(b) by 813 days.

(21) Appl. No.: 10/415,215

(22) PCT Filed: Oct. 22, 2001

(86) PCT No.: PCT/EP01/12168

§ 371 (c)(1),
(2), (4) Date: Sep. 18, 2003

(87) PCT Pub. No.: WO02/34854

PCT Pub. Date: May 2, 2002

(65) Prior Publication Data

US 2004/0047985 A1    Mar. 11, 2004

(30) Foreign Application Priority Data

Oct. 25, 2000  (DE) ................................ 100 52 955

(51) Int. Cl.
*B05D 5/10*    (2006.01)
*B05D 3/06*    (2006.01)
*C08J 7/18*    (2006.01)
*B32B 33/00*   (2006.01)

(52) U.S. Cl. ................. 427/207.1; 427/208.4; 427/532; 427/551; 428/41.5; 428/343

(58) Field of Classification Search .............. 427/207.1, 427/208.8
See application file for complete search history.

(56) References Cited

U.S. PATENT DOCUMENTS

| | | | | | |
|---|---|---|---|---|---|
| 3,284,423 | A | * | 11/1966 | Knapp .................... | 526/218.1 |
| 3,307,544 | A | * | 3/1967 | Brown et al. .......... | 428/355 CN |
| 4,185,050 | A | * | 1/1980 | Lazear et al. ............... | 525/221 |
| 4,306,039 | A | * | 12/1981 | Shah et al. ................... | 525/205 |
| 4,810,523 | A | * | 3/1989 | Williams et al. ............ | 427/505 |
| 4,908,403 | A | * | 3/1990 | Spada et al. ................. | 524/818 |
| 5,087,686 | A | * | 2/1992 | Ansell et al. ................... | 528/49 |
| 5,536,759 | A | * | 7/1996 | Ramharack et al. ........... | 522/35 |
| 5,866,249 | A | * | 2/1999 | Yarusso et al. ............. | 428/41.8 |
| 6,063,838 | A | * | 5/2000 | Patnode et al. .............. | 523/172 |
| 6,165,563 | A | * | 12/2000 | Chandran et al. ........... | 427/516 |

FOREIGN PATENT DOCUMENTS

| DE | 33 18 600 A1 | 5/1983 |
|---|---|---|
| DE | 100 34 069 A1 | 7/2002 |

(Continued)

OTHER PUBLICATIONS

English language Abstract of DE 33 18 600 A1, Dec. 22, 1983.
Database WPI Section Ch, Week 198935, Derwent Publications Ltd., London, GB; AN 1989-253446 XP 002193748& JP 01 185383 A (Nitto Denko Corp), Jul. 24, 1989.

(Continued)

*Primary Examiner*—Timothy H Meeks
*Assistant Examiner*—Cachet I Sellman
(74) *Attorney, Agent, or Firm*—Morris McLauglin & Marcus PA

(57) ABSTRACT

The use of a pressure sensitive adhesive possessing anisotropic properties for producing punched products.

16 Claims, 11 Drawing Sheets

FOREIGN PATENT DOCUMENTS

| | | |
|---|---|---|
| WO | 97/23577 | 3/1997 |
| WO | 97 235 77 | 7/1997 |
| WO | 02 027 09 A1 | 1/2002 |

OTHER PUBLICATIONS

Abstract of JP 01185383 A, Jul. 24, 1989.

* cited by examiner

Detailed views from Figure 1

USE OF SELF-ADHESIVE MATERIALS HAVING ANISOTROPIC PROPERTIES FOR PRODUCING STAMPING PRODUCTS

The invention relates to the use of carrier materials coated with anisotropic pressure sensitive adhesives for producing punched products and also to punched products obtainable in this way.

In the production of pressure sensitive adhesives (PSAs) use is increasingly made for reasons of cost and environment of the hotmelt technology. This technology also offers further technical advantages.

Hotmelt PSAs are distinguished by good properties in terms of transparency and weathering stability. Moreover, they are capable of meeting stringent requirements in the area of shear strength. These properties can be obtained favorably for polyacrylates with high molecular weight, high polarity, and subsequent effective crosslinking.

All existing PSAs, however, feature a more or less pronounced flow behavior. When strongly pronounced, this flow behavior is also known as cold flow or as bleeding of a PSA. The inherent behavior of a PSA leads to problems for its use for punched materials; thus, the storage times for the punched materials are limited and/or special, usually expensive, storage conditions are needed (for example, air conditioning of the storage areas).

In punching, materials can be scored or punched right through. Conventional PSAs have considerable disadvantages in respect of both procedures when used for punched materials, particularly in the form of a layer applied to a carrier material:

The punched-through materials can be separated from one another just a short time after the punching operation. After the punching operation the PSAs flow together again. The flowing-together of the PSA occurs in many kinds of product: not only adhesive transfer tapes (PSA applied to a release material), double-coated materials (PSA on both sides of a carrier, e.g., on film, paper, nonwoven, lay or foam) but also single-coated materials (PSA on one side of a carrier such as film, paper, nonwoven, lay or foam, for example) exhibit the effect of coalescence of the PSA after the punching operation. The punched products can no longer be separated from one another without destruction.

Particularly in the case of partial punching the coalescence of the PSA is accompanied additionally by the problem described in the following text. During partial punching of self-adhesive materials the release material is included in the partial punching; that is, the punching blades penetrate to a more or less defined depth into the substrate material (=release material). As a result, the antiadhesively finished surface of the release material (in the majority of cases the release materials are siliconized; this applies to all release systems described, Satas, $3^{rd}$ edition, chapters 26 and 27) is always destroyed. The adhesive is able to flow into the substrate material of the release material (paper, PET, PP, PE) and stick. The punched product can no longer be removed without problems from the siliconized release material, since the edges of the punched product have bonded to the substrate. In a downstream processing step the punched product, or the matrix latice around the punched products, which is to be removed, may tear as it is peeled away. Such tearing results in massive disruption to production, since partial-punching (kiss-cutting) operations are carried out predominantly in a continuous rotary punching process.

The effects described apply to all product constructions such as adhesive transfer tapes and also to single-coated and double-coated substrates such as films, nonwovens, papers, lays or foams, for example.

It is an object of the invention, therefore, to improve the production of punched products by avoiding or at least considerably reducing the prior art disadvantages depicted.

This object is achieved, surprisingly and in an unforeseeable way for the skilled worker, by the use of anisotropic pressure sensitive adhesives, as is set out in the main claim. The dependent claims relate to preferred developments of this use. The claims also relate to the punched products obtainable in this way.

The main claim accordingly provides for the use of a pressure sensitive adhesive possessing anisotropic properties for producing punched products.

The pressure sensitive adhesive is applied preferably to one or both sides of a carrier material. Suitable carrier material includes in principle films such as, for example, BOPP or MOPP, PET, PVC or papers or nonwovens (based on cellulose or polymers). Further suitable coating substrates include foams (e.g. PU, PE, PE/EVA, EPDM, PP, PE, silicone, etc.) or release papers (glassine papers, kraft papers, polyolefinically coated papers) or release films (PET, PP or PE or combinations of these materials).

The preparation, further processing or subsequent stressing of polymers or polymer compositions may be accompanied by the development of high degrees of orientation of the macromolecules in preferred directions in the unified polymer system as a whole; by means of this orientation, which may also be brought about deliberately, it is possible to control the properties of the polymers in question and improve them with a view to desired uses. Anisotropically oriented PSAs possess the tendency to move back into the initial state following stretching in a given direction, as a result of their 'entropy-elastic' behavior.

Suitable in principle for the inventive use are all PSAs which exhibit an orientation, examples being those based on natural rubbers and synthetic rubbers such as butyl rubber, neoprene, butadiene-acrylonitrile, styrene-butadiene-styrene, and styrene-isoprene-styrene copolymers, additionally those based on linear polyesters and copolyesters, polyurethanes, polysiloxane elastomers, based on straight acrylics, but very particularly anisotropic PSAs based on polyacrylate.

In the form of a layer, anisotropically oriented acrylic PSAs of this kind exhibit recession of the PSA film, following punching and/or cutting operations, at the cut and punched edge, this recession being utilized inventively for the punching-out (die-cutting) of punched shapes which do not go together again (coalesce). This property is not known for any of the existing, prior art pressure sensitive adhesives.

One advantageous development makes use for the purposes of the invention of a pressure sensitive adhesive
  which is obtainable by a free-radical addition polymerization,
  of which at least 65% by weight is based on at least one acrylic monomer from the group of the compounds of the following general formula:

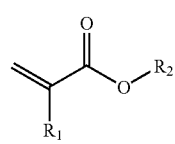

where $R_1$ is H or $CH_3$ and the radical $R_2$ is H or $CH_3$ or is chosen from the group of branched or unbranched, saturated alkyl groups having 2 to 20, preferably having 4 to 9, carbon atoms, for which the weight-average molecular weight as measured by gel permeation chromatography, of the pressure sensitive adhesive is at least 650,000, and which, when applied to a carrier, possesses a preferential direction, the refractive index measured in the preferential direction, $n_{MD}$, being greater than the refractive index measured in a direction perpendicular to the preferential direction, $n_{CD}$, and the difference $\Delta n = n_{MD} - n_{CD}$ being at least $1 \cdot 10^{-5}$.

The pressure sensitive adhesive outlined above has proven in a particularly advantageous fashion to be advantageous for the inventive use, so that outstanding results were able to be achieved in respect of the defined object.

As nonexclusive examples of alkyl group which can be employed preferably for the radical $R_2$, mention may be made in the text below of butyl, pentyl, hexyl, heptyl, octyl, isooctyl, 2-methylheptyl, 2-ethylhexyl, nonyl, decyl, dodecyl, lauryl or stearyl (meth)acrylate or (meth)acrylic acid.

The punching process also proceeds to excellent effect on inventive use of a pressure sensitive adhesive of which up to 35% by weight is based on comonomers in the form of vinyl compounds, in particular on one or more vinyl compounds chosen from the following group:

vinyl esters, vinyl halides, vinylidene halides, nitriles of ethylenically unsaturated hydrocarbons.

In the sense of the inventive use, acrylic compounds having functional groups are also embraced by the term "vinyl compound". Vinyl compounds of this kind containing functional groups are maleic anhydride, styrene, styrenic compounds, vinyl acetate, (meth)acrylamides, N-substituted (meth)acrylamides, β-acryloyloxypropionic acid, vinylacetic acid, fumaric acid, crotonic acid, aconitic acid, dimethylacrylic acid, trichloroacrylic acid, itaconic acid, vinyl acetate, hydroxyalkyl (meth)acrylate, amino-containing (meth)acrylates, hydroxyl-containing (meth)acrylates, with particular preference 2-hydroxyethyl (meth)acrylate, 2-hydroxypropyl (meth)acrylate, and/or 4-hydroxybutyl (meth)acrylate and double-bond-functionalized photoinitiators; the above list is only exemplary and not exhaustive.

For PSAs it is particularly advantageous if the composition of the corresponding monomers is chosen such that the resulting adhesives possess pressure sensitive adhesive properties in accordance with D. Satas [Handbook of Pressure Sensitive Adhesive Technology, 1989, VAN NOSTRAND REINHOLD, New York]. For this purpose the glass transition temperature of the acrylic PSA should be, for example, below 25° C.

The PSAs employed for the inventive use, particularly the polyacrylate PSAs praised above as being advantageous, are prepared preferably by a free-radically initiated addition polymerization. One process very suitable for this purpose is distinguished by the following steps:

polymerization of a mixture comprising at least one vinyl-, acrylic- or methacrylic-based monomer or a combination of these monomers, the weight-average molecular weight, as measured by gel permeation chromatography of the resulting polymers being above 650,000, subsequent extrusion coating of the polymer composition, subsequent crosslinking of the polymer composition on the carrier by irradiation with electron beams.

The extrusion coating here takes place preferably through an extrusion die. The extrusion dies used come from one of the three following categories: T-die, fishtail die, and coathanger die. The individual types differ in the design of their flow channel. In order to produce oriented acrylic PSAs it is particularly preferred to carry out coating onto a carrier using a coathanger die, specifically such that a polymer layer is formed on the carrier by a movement of die relative to carrier.

The time period between coating and crosslinking is advantageously very low, preferably not more than 10 s.

By the shaping of the acrylic hotmelt in the coathanger die and its emergence from the die with a defined film thickness, by the drawing of the PSA film to a thinner film thickness during transfer to the carrier material, and by the subsequent inline crosslinking, the orientation is obtained.

The free radical polymerization may be conducted in the presence of an organic solvent or in the presence of water or in mixtures of organic solvents and water or without solvent. It is preferred to use as little solvent as possible. The polymerization time, depending on the conversion and temperature, is between 6 and 48 h. In the case of solution polymerization it is preferred as solvents to use esters of saturated carboxylic acids (such as ethyl acetate), aliphatic hydrocarbons (such as n-hexane or n-heptane), ketones (such as acetone or methyl ethyl ketone), special-boiling-point spirit or mixtures of these solvents. For polymerization in aqueous media or in mixtures of organic and aqueous solvents, it is preferred to add the emulsifiers and stabilizers which are known to the skilled worker for this purpose to the polymerization. Polymerization initiators used are customary free-radical-forming compounds such as, for example, peroxides, azo compounds, and peroxosulfates. Mixtures of initiators may also be used. During polymerization it is possible to use further regulators for reducing the molecular weight and lowering the polydispersity. As so-called polymerization regulators it is possible, for example, to use alcohols and ethers. The weight-average molecular weight, as measured by gel permeation chromatography of the acrylic PSAs is advantageously between 650,000 and 2,000,000 g/mol, more preferably between 700,000 and 1,000,000 g/mol.

In one preferred procedure, the polymerization is conducted in polymerization reactors which in general have been provided with a stirrer, two or more feed vessels, reflux condenser, heating, and cooling and which are equipped for operation under $N_2$ atmosphere and superatmospheric pressure.

Following polymerization in solvent, the polymerization medium can be removed under reduced pressure, this operation being conducted at elevated temperatures in the range, for example, of from 80 to 150° C. The polymers can then be used in the solvent-free state, particularly as hotmelt PSAs. In certain cases it is also an advantage to prepare the polymers of the invention without solvent.

In order to prepare the acrylic PSAs, the polymers may undergo conventional modification. By way of example it is possible to add tackifying resins, such as terpene resins, terpene-phenolic resins, C5, C9, and C5/C9 hydrocarbon resins, pinene resins, indene resins or rosins, alone or in combination with one another. It is also possible, furthermore, to use plasticizers, various fillers, e.g., fibers, carbon black, zinc oxide, titanium dioxide, solid microbeads, solid or hollow glass beads, silica, silicates, chalk, blocking-free isocyanates, etc.), aging inhibitors, light stabilizers, ozone protectants, fatty acids, plasticizers, nucleators, blowing agents and/or accelerators as additives. In addition it is possible to admix crosslinkers and crosslinking promoters. Examples of suitable crosslinkers for electron beam crosslinking are difunctional or polyfunctional acrylates, difunctional or polyfunctional isocyanates or difunctional or polyfunctional epoxides.

The straight or blended acrylic hotmelts are coated onto the carrier material by means of a die with a variable slot width and are then cured on the carrier with electron beams. Crosslinking takes place in inline operation immediately after the PSA has been applied to the carrier.

The invention additionally provides a punched product comprising a carrier material coated on one or both sides with an anisotropic pressure sensitive adhesive.

Punched products of this kind can be used as single-sidedly or double-sidedly adhering labels, for adhesive bonding in the household and in industry, particularly in automobile construction, for all assembly purposes, the medical sector (plasters, wound coverings), and the like, to name but a few examples of their use. Generally speaking, the punched products can be employed wherever adhesive labels and adhesive sheets are used. The punched products are especially suitable in situations where value is placed on a clean, undamaged edge of the punched product.

EXPERIMENTS

Figure 1:
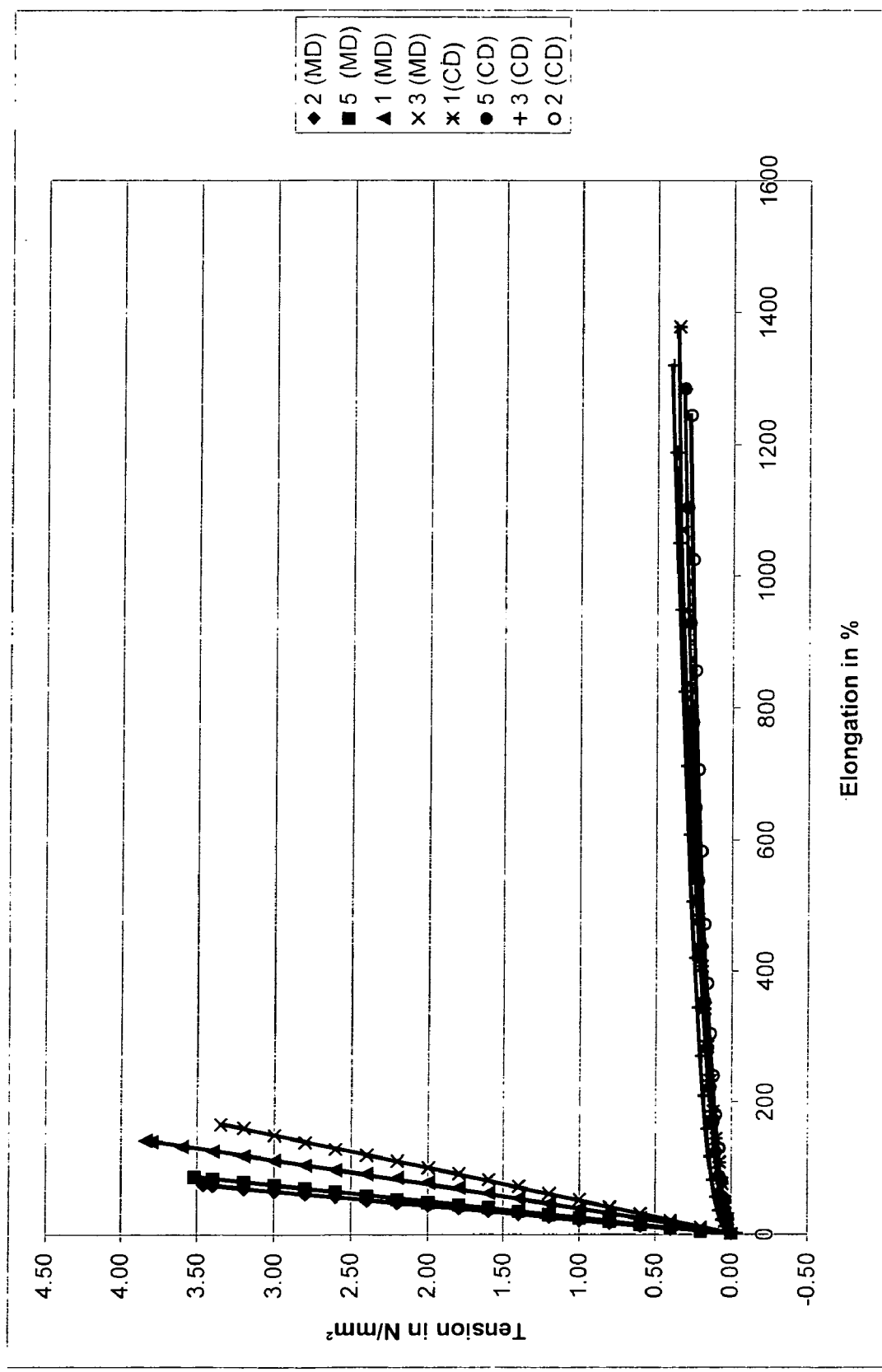
FIGS. 1 and 2 show the tensile stress/elongation curves of Examples 7-10.

The invention is described below by means of experiments, without wishing to be restricted unnecessarily by the choice of the samples investigated.

The following test methods were employed to evaluate the anisotropic properties of the PSAs prepared.

Test Methods

180° Bond Strength Test (Test A)

A strip 20 mm wide of an acrylic pressure sensitive adhesive coated onto a polyester or siliconized release paper was applied to steel plates. Depending on direction and drawing, longitudinal transverse specimens were bonded to the steel plate. The PSA strip was pressed onto the substrate twice using a 2 kg weight. The adhesive tape was then immediately peeled from the substrate at an angle of 180° and at 30 mm/min. The steel plates had been washed twice with acetone and once with isopropanol. The measurement results are reported in N/cm and are averaged from three measurements. All measurements were conducted at room temperature under climatized conditions.

Measurement of the Birefringence (Test B)

Version 1

Two crossed polaroid filters were placed in the sample beam of a Uvikon 910 spectrophotometer. Oriented acrylates were fixed between two slides. The film thickness of the oriented sample was determined from preliminary experiments by means of thickness gages. The sample thus prepared was placed in the measuring beam of the spectrophotometer, with its direction of orientation deviating in each case by 45° from the optical axes of the two polaroid filters. The transmission, T, was then monitored over time by means of a time-resolved measurement. The transmission data were then used to determine the birefringence in accordance with the following relationship:

$T = \sin^2(\pi \times R)$, where R=retardation.

The retardation R is made up as follows:

$$R = \frac{d}{\lambda}\Delta n,$$

where d=sample thickness

The transmission is also made up of $$T = \frac{I_t}{I_0}$$

This ultimately provides, for the birefringence:

$$\Delta n = \frac{\lambda}{\pi d}\arcsin\sqrt{T}$$

Version 2

The birefringence was measured with an experimental setup such as that described analogously in the Encyclopedia of Polymer Science, John Wiley & Sons, Vol. 10, p. 505, 1987 as a circular polariscope. The light emitted by a diode-pumped solid-state laser of wavelength $\lambda$=532 nm is first of all linearly polarized by a polaroid filter and then circularly polarized using a $\lambda/4$ plate with $\lambda$=532 nm. The laser beam thus polarized is then passed through the oriented acrylate composition. Since acrylate compositions are highly transparent, the laser beam is able to pass through the composition virtually unhindered. Where the polymer molecules of the acrylate composition are oriented, this results in a change in the polarizability of the acrylate composition depending on observation angle (birefringence). As a result of this effect, the E vector of the circularly polarized laser beam undergoes a rotation about the axis of progression of the laser beam. After departing the sample, the laser beam thus manipulated is passed through a second $\lambda/4$ plate with $\lambda$=532 nm whose optical axis deviates by 90° from the optical axis of the first $\lambda/4$ plate. This filter is followed by a second polaroid filter which likewise deviates by 90° from the first polaroid filter. Finally, the intensity of the laser beam is measured using a photosensor, and Δn is determined as described under version 1.

Determination of the Gel Fraction (Test C)

After careful drying, the solvent-free adhesive samples are welded into a pouch made of polyethylene nonwoven (Tyvek web). The gel value is determined from the difference in the sample weight before and after extraction with toluene.

Measurement of the Tensile Stress/Elognation Behavior (test D)

Strips of the specimen with a width of at least 30 mm and a length of 50 mm were laminated to form a sample element, to give a thickness of 0.5 mm. Any air inclusions were very substantially avoided. The resulting laminate was cut to a width of exactly 20 mm and the ends of the strips were bonded to paper. The length of the sample piece between the paper strip ends was exactly 25 cm. The thickness of the strip was subsequently determined to an accuracy of 10 μm using a thickness gage. The sample element obtained in this way was then subjected to a tensile stress/elongation measurement with the assistance of a universal testing machine (from Frank). The forces measured were in each case specified as tension in relation to the initial cross section. The relative elongations relate to the original length of 25 mm. The test speeds set were 100, 300 and 600 mm/min.

Measurement of the Shrinkback (Test E)

Strips with a width of at least 20 mm and a length of 20 cm were cut parallel to the coating direction of the hotmelt. 3 strips for application rates of 130 g/m$^2$, 4 strips at 100 g/m$^2$, and 8 strips at 50 g/m$^2$ were laminated to one another so as to give comparable layer thicknesses. The specimen obtained in this way was then cut to a width of exactly 20 mm and was overstuck at each end with paper strips, with a spacing of 15 cm. The test element prepared in this way was then suspended vertically at RT and the change in length was monitored over time until no further shrinkage of the sample could be found. The initial length reduced by the final value was then reported, relative to the initial length, as the shrinkback, in percent.

For measuring the orientation after a longer time, the coated and oriented pressure sensitive adhesives were stored in the form of swatches for a prolonged period, and then analyzed.

Production and Investigation of the Punched Products (Test F)

Punched products were produced on standard commercial flatbed or rotary punches. For the rotary punching tests, rotary punch cylinders from the company Rotometrics—Rotationsstanzwerkzeuge GmbH, Mainz-Kastel, were used.

For intermittent punching (flatbed or reciprocating punch) punching tools from the company Winck-Stanzwerkzeuge, Neuenhaus were used.

The shrinkback of the pressure sensitive adhesive was assessed microscopically and measured quantitatively. The shrinkback distance L was defined as the distance from the punched edge of the film and release material to the receded pressure sensitive adhesive layer.

Preparation of the Samples

EXAMPLE 1

A 200 L reactor conventional for free-radical polymerizations was charged with 2500 g of acrylic acid, 47.5 kg of 2-ethylhexyl acrylate and 30 kg of acetone/isopropanol (97:3). After nitrogen gas had been passed through for 45 minutes with stirring the reactor was heated to 58° C. and 20 g of 2,2'-azoisobutyronitrile (AIBN) were added. The external heating bath was then heated to 75° C. and the reaction was carried out constantly at this external temperature. After a reaction time of 1 hour a further 20 g of AIBN were added. After 5 hours and 10 hours, in each case 15 kg of acetone/isopropanol (97:3) were added for dilution. The reaction was terminated after a time of 48 hours and the system was cooled to room temperature. The product was coated from solution at 130 g/m$^2$ using a laboratory coating bar onto a primed polyester carrier, dried in a drying cabinet at 120° C. for 10 minutes, lined with siliconized release paper, and finally irradiated with electron beams, with a dose of 40 kGy and an acceleration voltage of 230 kV. Analysis was carried out using test methods A, B, and C.

For the hotmelt coatings the solvent was removed in a concentrating extruder.

EXAMPLE 2

Preparation took place as in Example 1. The polymerization was carried out using 5000 g of acrylic acid, 45 kg of 2-ethylhexyl acrylate and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

EXAMPLE 3

Preparation took place as in Example 1. The polymerization was carried out using 3500 g of acrylic acid, 36.5 kg of 2-ethylhexyl acrylate, 10 kg of methyl acrylate and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

EXAMPLE 4

Preparation took place as in Example 1. The polymerization was carried out using 3000 g of acrylic acid, 35.5 kg of 2-ethylhexyl acrylate, 7.5 kg of methyl acrylate, 4 kg of N-tert-butylacrylamide and 30 kg of acetone/isopropanol (97:3). In the further course of the polymerization, the identical amounts of solvent and initiator were used. The specimens were irradiated with electron beams in a dose of 30 kGy. Analysis was carried out using test methods A, B and C.

EXAMPLE 5a

Preparation took place as in Example 1. The polymerization was carried out using 3500 g of acrylic acid, 20.75 kg of 2-ethylhexyl acrylate, 20.75 kg of butyl acrylate, 5 kg of methyl acrylate and 30 kg of acetone/isopropanol (97:3). In the further course of the polymerization, the identical amounts of solvent and initiator were used. The specimens were irradiated with electron beams in a dose of 50 kGy. Analysis was carried out using test methods A, B and C.

EXAMPLE 5b

Preparation took place as in Example 1. The polymerization was carried out using 3500 g of acrylic acid, 20.75 kg of 2-ethylhexyl acrylate, 20.75 kg of butyl acrylate, 5 kg of methyl acrylate and 30 kg of acetone/isopropanol (97:3). In addition, 21.5 kg of Foral 85 (from Hercules, hydrogenated rosin ester) were mixed in. In order to achieve optimum crosslinking, 2% by weight of SR 610 (from Sartomer) were mixed in. The specimens were irradiated with electron beams in a dose of 75 kGy. Analysis was carried out using test methods A, B and C.

EXAMPLE 6

Drawing of the Acrylic Hotmelts, Speciments A-L

To produce specimens A-L, Example 4 was concentrated in a drying extruder and coated through a die having a 300 μm (specimens A-F) or 780 μm (G-L) slot width onto a siliconized release paper carrier, at 130 g/m².

The web speed of the carrier was 80 m/min. For specimens A-C and G-I the release paper carrier was passed together with the PSA film over a chill roll at 25° C. In the case of specimens D-F and J-L this roll was heated at 90° C. To investigate the relaxation behavior, specimens A, D, G and J were subjected immediately after coating, in an inline operation, to crosslinking with electron beams, with a dose of 30 kGy and an acceleration voltage of 230 kV EBC. Specimens B, E, H, and K were stored at room temperature for an hour after coating and then subjected to electron beam crosslinking with identical process parameters. Specimens C, F, I, and L were stored at room temperature for 48 hours after coating and then subjected to electron beam crosslinking with identical process parameters. Analysis of all the specimens was carried out using test methods A, B and C.

EXAMPLE 7

Specimen 1#

The procedure of Example 6 was repeated. The PSA used was that of Example 1. Coating takes place through a 300 μm die at an application rate of 130 g/m², a chill roll temperature of 25° C. (external temperature of the chill roll on which the carrier material is coated), and a web speed of 80 m/min. Crosslinking was carried out with electron beams in a dose of 40 kGy, and analysis was carried out using test methods A, B, C, D, and E.

EXAMPLE 8

Specimen 2#

The procedure of Example 6 was repeated. The PSA used was that of Example 2. Coating takes place through a 300 μm die at an application rate of 130 g/m², a chill roll temperature of 25° C., and a web speed of 80 m/min. Crosslinking was carried out with electron beams in a dose of 30 kGy, and analysis was carried out using test methods A, B, C, D, and E.

EXAMPLE 9

Specimen 3#

The procedure of Example 6 was repeated. The PSA used was that of Example 3. Coating takes place through a 300 μm die at an application rate of 130 g/m², a chill roll temperature of 25° C., and a web speed of 80 m/min. Crosslinking was carried out with electron beams in a dose of 30 kGy, and analysis was carried out using test methods A, B, C, D, and E.

EXAMPLE 10

Specimen 5#

The procedure of Example 6 was repeated. The PSA used was that of Example 5. Coating takes place through a 300 μm die at an application rate of 130 g/m², a chill roll temperature of 25° C., and a web speed of 80 m/min. Crosslinking was carried out with electron beams in a dose of 50 kGy, and analysis was carried out using test methods A, B, C, D, and E.

EXAMPLE 11

Specimen 6#

The procedure of Example 6 was repeated. The PSA used was that of Example 4. Coating takes place through a 300 μm die at an application rate of 100 g/m² onto both sides of a PET film 12 μm thick. Coating took place in 2 passes. The chill roll temperature was 25° C., and the web speed was 80 m/min. Crosslinking was carried out with electron beams in a dose of 50 kGy, and analysis was carried out using test methods A, B, C, D, and E.

EXAMPLE 12

Specimen 7#

The procedure of Example 6 was repeated. The PSA used was that of Example 5b. Coating takes place through a 300 μm die at an application rate of 100 g/m² onto both sides of a PET film 12 μm thick. Coating took place in 2 passes. The chill roll temperature was 25° C., and the web speed was 80 m/min. Crosslinking was carried out with electron beams in a dose of 75 kGy, and analysis was carried out using test methods A, B, C, D, and E.

EXAMPLE 13

Specimen 8#

The procedure of Example 6 was repeated. The PSA used was that of Example 5b. Coating takes place through a 300 μm die at an application rate of 100 g/m² onto both sides of a BOPP film 50 μm thick. Coating took place in 2 passes. The chill roll temperature was 25° C., and the web speed was 80 m/min. Crosslinking was carried out with electron beams in a dose of 75 kGy, and analysis was carried out using test methods A, B, C, D, and E.

EXAMPLE 14

Specimen 9#

The procedure of Example 6 was repeated. The PSA used was that of Example 5b. Coating takes place through a 300 μm die at an application rate of 100 g/m² onto both sides of a BOPP film 50 μm thick. The BOPP film was subjected to inline corona pretreatment on both sides immediately before the coating operation. The surface tension thereafter was <45 mN/m. Coating took place in 2 passes. The chill roll temperature was 25° C., and the web speed was 80 m/min. Crosslinking was carried out with electron beams in a dose of 75 kGy, and analysis was carried out using test methods A, B, C, D, and E.

Results

In order to investigate the orientation of acrylic PSAs and their crosslinkability, first of all a variety of acrylic PSAs were prepared by free radical polymerization. In terms of temperature stability and flow viscosity, all of the adhesives can be processed by the hotmelt process. The acrylic PSAs prepared were polymerized in solution and then concentrated in a drying extruder. The comonomer composition of the individual adhesives is listed in Table 1.

TABLE 1

Comonomer composition of the individual acrylic PSAs

| Example | 2-EHA | BA | MA | NTBAM | AS |
|---------|-------|------|----|-------|----|
| 1 | 95 | 0 | 0 | 0 | 5 |
| 2 | 90 | 0 | 0 | 0 | 10 |
| 3 | 73 | 0 | 20 | 0 | 7 |
| 4 | 71 | 0 | 15 | 8 | 6 |
| 5 a/b | 41.5 | 41.5 | 10 | 0 | 7 |

2-EHA: 2-ethylhexyl acrylate
BA: butyl acrylate
MA: methyl acrylate
NTBAM: N-tert-butylacrylamide
AS: acrylic acid The weight-average molecular weight, as measured by gel permeation chromatography, of Examples 1-5a/5b was approximately 800,000 g/mol. As reference specimens, Examples 1-5a/5b were applied from solution onto a primed polyester film at 130 g/m$^2$, dried at 120° C., cured with electron beams, and then subjected to adhesive testing. For an assessment of the efficiency of crosslinking, the gel value of the adhesives was measured. The gel value expresses the insoluble fraction of the PSA in toluene. Additionally, instantaneous bond strengths on steel were measured. The results of the tests are set out in Table 2.

TABLE 2

Adhesive test of the reference specimens

| Example | Electron beam dose [kGy] | Gel value [%] | BS-steel [N/cm] |
|---------|--------------------------|---------------|------------------|
| 1 | 40 | 65 | 6.5 |
| 2 | 30 | 55 | 6.0 |
| 3 | 30 | 56 | 5.9 |
| 4 | 30 | 59 | 6.1 |
| 5a | 50 | 72 | 6.5 |
| 5b | 75 | 67 | 9.5 |

BS: bond strength on steel

The gel values vary, depending on comonomer composition and dose, between 55 and 72%.

As a result of the relatively high fraction of polar monomers, the resin-free adhesives are cohesive and therefore possess relatively low instantaneous bond strengths on steel of approximately 6-6.5 N/cm. Measurements in cross and machine direction showed virtually the same bond strengths within the bounds of measurement error. Measurement of the birefringence showed no orientation within the adhesives. No difference in polarizability in cross and machine directions was found.

To investigate the orientation effect, Examples 1-5a/b were concentrated in a drying extruder to form 100% systems and were coated through a die at different slot widths.

In order to produce oriented acrylic hotmelts, the PSA was preoriented within the die by means of the flow process. The adhesive film is subsequently transferred to the carrier material with a defined film thickness. For setting the film thickness, a defined draw ratio between die width and film thickness is necessary. This effect can be reinforced by increasing the coating speed (web speed of the receiving carrier material). Through the ratio of die gap width to film thickness of the adhesive on the carrier material it is possible to vary freely the extent of orientation of the polymer chains.

For experimental confirmation, the adhesives were coated with different draw ratios and other experimental parameters. To minimize the relaxation time the PSA was crosslinked with electron beams in an inline operation after coating. The relaxation times were therefore well below 10 s. Supplementary experiments have shown that orientations are still detectable after 48 hours. These experiments were conducted for Example 4 using the optimum draw ratio, the optimum temperature of the coating roll, and the point in time of inline crosslinking. The experiments are summarized in Table 3.

TABLE 3

Experimental parameters relating to orientation of adhesive 4

| Specimen | Draw ratio | Roller temperature [° C.] | Point in time of crosslinking | Δn |
|----------|------------|---------------------------|------------------------------|-----|
| A | 1:2.3 | 25 | 2 s | $9.3 \cdot 10^{-5}$ |
| B | | | 1 h | $4.2 \cdot 10^{-5}$ |
| C | | | 48 h | $6.6 \cdot 10^{-6}$ |
| D | | 90 | 2 s | $3.4 \cdot 10^{-5}$ |
| E | | | 1 h | $7.8 \cdot 10^{-6}$ |
| F | | | 48 h | — |
| G | 1:6 | 25 | 2 s | $1.0 \cdot 10^{-4}$ |
| H | | | 1 h | $5.6 \cdot 10^{-5}$ |
| I | | | 48 h | $8.3 \cdot 10^{-6}$ |
| J | | 90 | 2 s | $7.4 \cdot 10^{-5}$ |
| K | | | 1 h | $9.7 \cdot 10^{-6}$ |
| L | | | 48 h | — |

Δn: difference between refractive index $n_{MD}$ in the direction of stretching and the refractive index $n_{CD}$ perpendicular thereto.

The draw ratio was set by varying the width of the die. The application rate remained constant at 130 g/m$^2$. The specimens were in each case irradiated with an electron beam dose of 30 kGy. All of the specimens drawn are listed alphabetically.

Orientation within the acrylic PSAs was determined by quantifying the birefringence. The refractive index n of a medium is given by the ratio of the speed of light $c_0$ in a vacuum to the speed of light c in the medium in question ($n=c_0/c$), n being a function of the wavelength of the respective light. As a measure of the orientation of the PSA, use is made of the difference Δn between the refractive index measured in a preferential direction (stretching direction, machine direction MD), $n_{MD}$, and the refractive index measured in a direction perpendicular to the preferential direction (cross direction, CD), $n_{CD}$. In other words, $\Delta n = n_{MD} - n_{CD}$; this figure is obtainable through the measurements described in test B.

All specimens showed orientation of the polymer chains. The Δn values found are listed in Table 3, with the greatest orientation being measured for specimen G ($\Delta n = 1.0 \times 10^{-4}$). For specimen A, which was not drawn to such a great extent, a Δn of $9.3 \times 10^{-5}$ was found.

The corresponding Δn value is dependent on the comonomer composition and on the degree of branching of the polymer. For the polymers illustrated here, the PSA is oriented in accordance with the invention when the Δn value is $>1 \times 10^{-5}$.

Orientation within the acrylic PSAs to the degree indicated above was therefore demonstrated for the samples measured through the birefringence measurement.

The consequences for the technical adhesive properties are depicted in Table 4:

TABLE 4

| Specimen | Gel value [%] | BS-steel MD [N/cm] | BS-steel CD [N/cm] |
| --- | --- | --- | --- |
| A | 61 | 5.2 | 6.7 |
| B | 59 | 5.8 | 6.4 |
| C | 59 | 6.1 | 6.2 |
| D | 59 | 6.3 | 6.6 |
| E | 60 | 6.0 | 6.4 |
| F | 56 | 6.1 | 6.0 |
| G | 63 | 4.9 | 6.9 |
| H | 62 | 5.9 | 6.5 |
| I | 60 | 6.0 | 6.1 |
| J | 62 | 5.8 | 6.7 |
| K | 59 | 5.9 | 6.4 |
| L | 58 | 6.0 | 6.0 |

Application rate 130 g/m$^2$
BS: bond strength on steel;
MD (machine direction; stretching direction);
CD (cross direction, transverse direction)

For specimens A and G, with reference to the bond strength for MD (machine direction; stretching direction) (longitudinal direction in which the PSA was drawn)) and for CD (cross direction, transverse direction, perpendicular to MD), only relatively small differences in bond strength were measured, the low values being measured in each case for MD. The gel values after electron beam crosslinking also showed relatively little fluctuation with the degree of orientation. The greatest orientations were achieved with a short relaxation time and a cold coating roller.

In order to ensure universal applicability, and to investigate the recession effect in self-adhesive punched products, further acrylic hotmelts having different comonomer compositions were coated from the melt.

The results of technical adhesive testing are set out in Table 5.

TABLE 5

| Specimen | Electron beam dose [kGy] | Gel value [%] | BS-steel MD [N/cm] | BS-steel CD [N/cm] | Δn |
| --- | --- | --- | --- | --- | --- |
| 1# | 40 | 72 | 5.8 | 6.8 | $1.5 \cdot 10^{-4}$ |
| 2# | 30 | 62 | 5.7 | 6.4 | $0.8 \cdot 10^{-4}$ |
| 3# | 30 | 61 | 5.5 | 6.2 | $1.2 \cdot 10^{-4}$ |
| 5# | 50 | 75 | 5.9 | 6.7 | $0.6 \cdot 10^{-4}$ |
| 6# | 50 | 73 | 9.6 | 9.8 | $0.5 \cdot 10^{-4}$ |
| 7# | 75 | 65 | 11.4 | 11.6 | $0.5 \cdot 10^{-4}$ |
| 8# | 75 | 64 | 13.5 | 14.1 | $0.6 \cdot 10^{-4}$ |
| 9# | 75 | 64 | 13.2 | 13.8 | $0.6 \cdot 10^{-4}$ |

Application rate 130 g/m$^2$ (specimens 1#, 2#, 3#, 5#)
Application rate 2 × 100 g/m$^2$ on PET, thickness 12 μm (specimens 6#, 7#)
Application rate 2 × 100 g/m$^2$ on BOPP, thickness 50 μm (specimens 8#, 9#)
Gel values are always based on the crosslinked amount of straight acrylic
BS: bond strength on steel
MD (machine direction; stretching direction); CD (cross direction, transverse direction)
Δn: difference between refractive index $n_{MD}$ in the stretching direction and refractive index $n_{CD}$ perpendicular thereto.

The tests on the drawn specimens show that, generally speaking, acrylic PSAs having anisotropic adhesive properties can be produced by shaping the PSA in an extrusion die, subjecting it to severe drawing during coating, and subsequently "freezing in" this state by electron beam irradiation. The Δn values determined for specimens 1# to 9# are at approximately the same level as that for specimen G. For specimens 1#, 2#, 3#, and 5# to 9# only relatively small differences in bond strengths for machine direction and cross direction were measured. In turn, relatively low bond strengths were measured in the stretching direction (MD).

Figure 2:
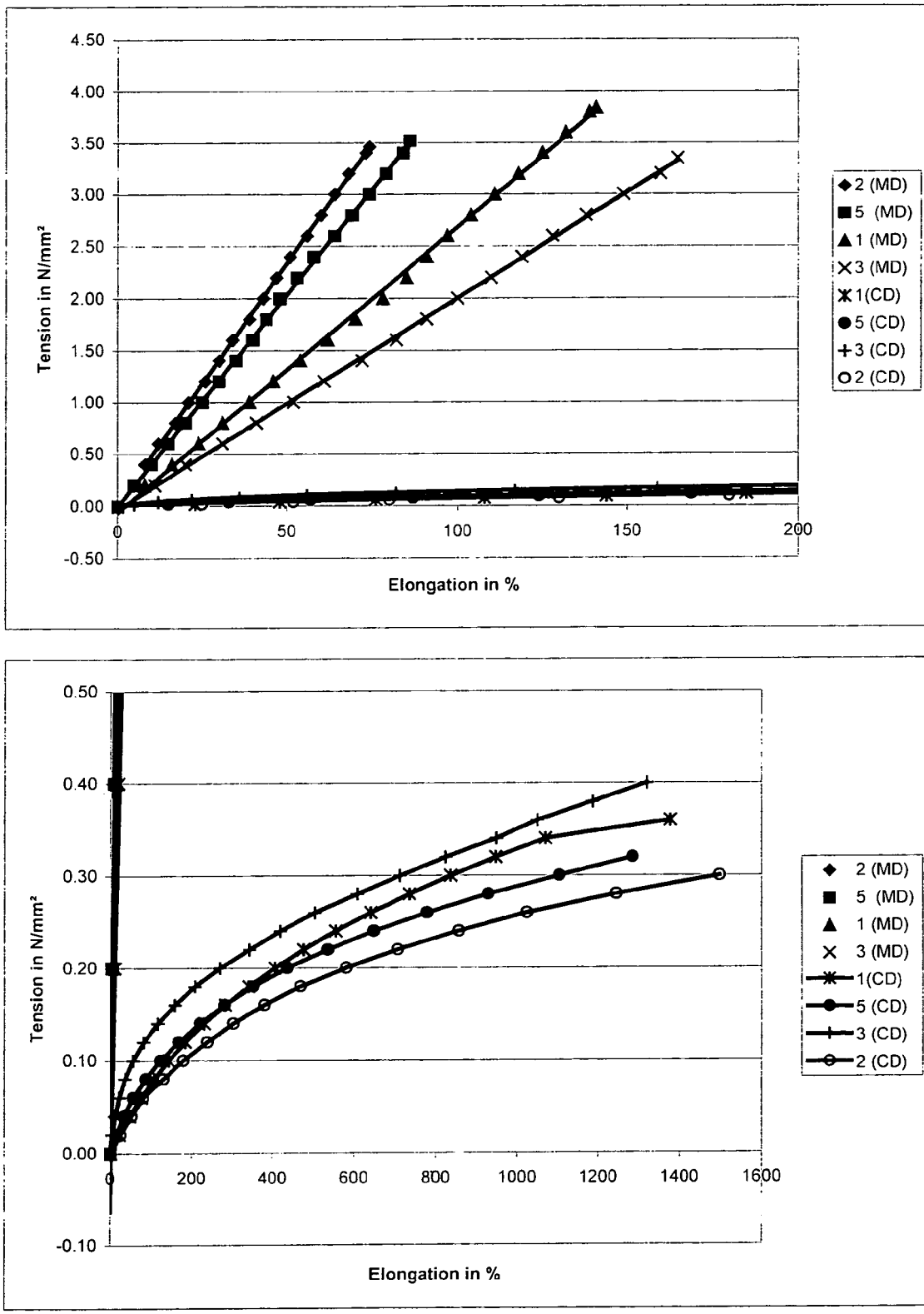

In contrast, tensile stress/elongation measurements show a marked effect of the orientation on the physical properties of the PSAs. FIGS. 1 and 2 show the tensile stress/elongation curves of specimens 1#, 2#, 3#, and 5#.

Specimens 1#, 2#, 3#, and 5# exhibit a significantly lower level of elongation following orientation in the stretching direction (MD). The stress rises rapidly even over a very short length, and the specimens tear. In the cross direction (CD), examples can be stretched further at well above 1000% elongation and possess significantly lower tensile strength in this direction.

For the advantageous application of the oriented PSAs in the die cut sector, the shrinkback is a decisive factor. Oriented adhesives have a tendency, after stretching in a given direction, to move back to the initial state as a result of their 'entropy-elastic' behavior. In order to record this problem analytically, the shrinkback of the oriented specimens in the free film was measured.

The values determined at room temperature are listed in Table 6:

TABLE 6

| Specimen | Shrinkback [%] |
| --- | --- |
| 1# | 91 |
| 2# | 95 |
| 3# | 93 |
| 5# | 90 |
| 6# | 85 |
| 7# | 65 |
| 8# | 64 |
| 9# | 63 |

Specimens 1#, 2#, 3#, 5#: application rate 130 g/m$^2$
Specimens 6# to 9#: application rate 100 g/m$^2$ The values were in each case determined after storage for 1 week. Furthermore, the severe shrinkback of all the oriented specimens illustrates the propensity of the PSA to return to the original state. By electron beam crosslinking it is possible to freeze in the orientation. All specimens from Table 6 were crosslinked in Table 7 with the electron beam doses depicted, and then the shrinkback of these PSAs was redetermined after storage for 2 months.

TABLE 7

| Specimen | Electron beam dose [kGy] | Shrinkback [%] |
| --- | --- | --- |
| 1# | 40 | 89 |
| 1# | 0 | −25 |
| 2# | 30 | 94 |
| 2# | 0 | −5 |
| 3# | 30 | 92 |
| 3# | 0 | 0 |
| 5# | 50 | 90 |
| 5# | 0 | −8 |
| 6# | 50 | 83 |
| 6# | 0 | −8 |
| 7# | 75 | 59 |
| 7# | 0 | −35 |
| 8# | 75 | 57 |
| 8# | 0 | −45 |
| 9# | 75 | 61 |
| 9# | 0 | −48 |

Specimens 1#, 2#, 3#, 5#: application rate 130 g/m$^2$
Specimens 6# to 9#: application rate 100 g/m$^2$ Table 7 demonstrates that the electron beam crosslinking froze in the orientation and, through the shrinkback, this orientation can be utilized for product applications even after storage for 2 months. Comparison with the uncrosslinked specimens in each case illustrates that the PSAs relax without crosslinking and hence the shrinkback is no longer in existence. On the contrary, with some of the samples even an extension is in fact observed during measurement here, which can be attributed to the force of gravity acting on the suspended samples. The resin-blended PSAs exhibit a pronounced flow behavior.

Figure 3A:
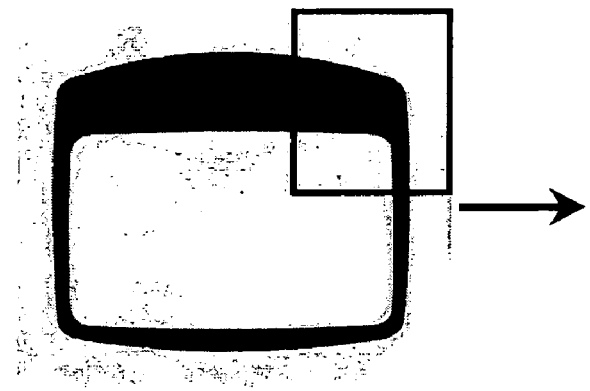
FIG. 3a shows the shape of the punched product produced from the specimens of Examples 10-14.
Figure 3B:
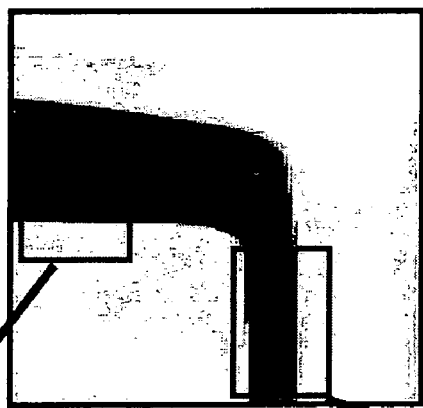
FIG. 3b illustrates the points at which shrinkback was measured for the punched product produced from the specimens of Examples 10-14.
Figure 3C:
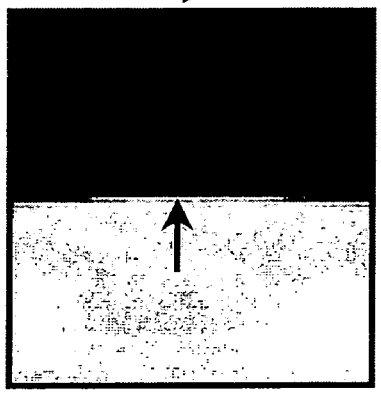
FIG. 3c depicts an enlargement of the microscope photograph for assessing the recession behavior of the top edge of the punched product produced from the specimens of Examples 10-14 (traverse to the direction of stretching).
Figure 3D:
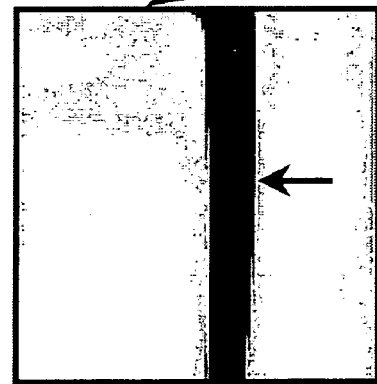
FIG. 3d shows the an assessment of the recession behavior of the sidepiece of the punched product produced from the specimens of Examples 10-14 (longitudinal with respect to the stretching direction).

To assess the recession behavior of the pressure sensitive adhesive in the punched product, a punched product was produced by rotary punching from specimens 5# to 9#. FIG. 3a shows the shape of the punched product, with the arrow indicating the stretching direction. The recession behavior was examined by microscope on the top edge (punched edge extends parallel to the stretching direction) and on the sidepieces (punched edge extends transversely to the stretching direction). FIG. 3b illustrates the points at which shrinkback was measured, while FIG. 3c depicts an enlargement of the microscope photograph for assessing the top edge of the sample (transverse to the direction of stretching) while FIG. 3d shows that for assessing the sidepiece (longitudinal with respect to the stretching direction).

Table 8 records the observed shrinkback of the PSA as a function of the time after punching.

TABLE 8

Shrinkback distance L (μm)
Distance of the receded PSA from the punched edge of
the film/release material

| Specimen | Top edge Recession length L after 24 h, RT | Top edge Recession length L after 1 week, RT | Sidepiece Recession length L after 24 h, RT | Sidepiece Recession length L after 1 week, RT |
|---|---|---|---|---|
| 5# | 5 | 4 | 350 | 290 |
| 6# | 3 | 3 | 180 | 171 |
| 7# | 4 | 4 | 105 | 102 |
| 8# | 3 | 4 | 95 | 92 |
| 9# | 2 | 3 | 30 | 28 |

For the inventive use the PSAs preferably possess a recession behavior of 20 to 800 μm, in particular from 30 to 100 μm, measured in the stretching direction.

The recession can be accelerated significantly by application of temperature. After just a short time a virtually constant end value is obtained.

In Table 9, the shrinkback of some of the specimens has been measured as a function of temperature and time.

TABLE 9

| Specimen | Time [h]/temperature [° C.] | Shrinkback [%] |
|---|---|---|
| 1# | 2/40 | 72 |
| 1# | 2/60 | 78 |
| 2# | 3/40 | 76 |
| 2# | 3/60 | 81 |
| 3# | 2/40 | 70 |
| 3# | 3/60 | 82 |
| 5# | 2/40 | 73 |
| 5# | 2/60 | 80 |

Application rate 130 g/m²

As a result of the temperature treatment the shrinkback is substantially accelerated. With thermal conditioning at 60° C., the samples attain a shrinkback of more than 80% after just a relatively short time (3 h) and hence approach a figure which is otherwise only achieved on storage for several days.

Following punching and slitting operations, the samples of the anisotropically oriented acrylic PSAs present in the form of layers exhibit a recession of the PSA layer which prevents coalescence of the PSAs.

Figure 4A:
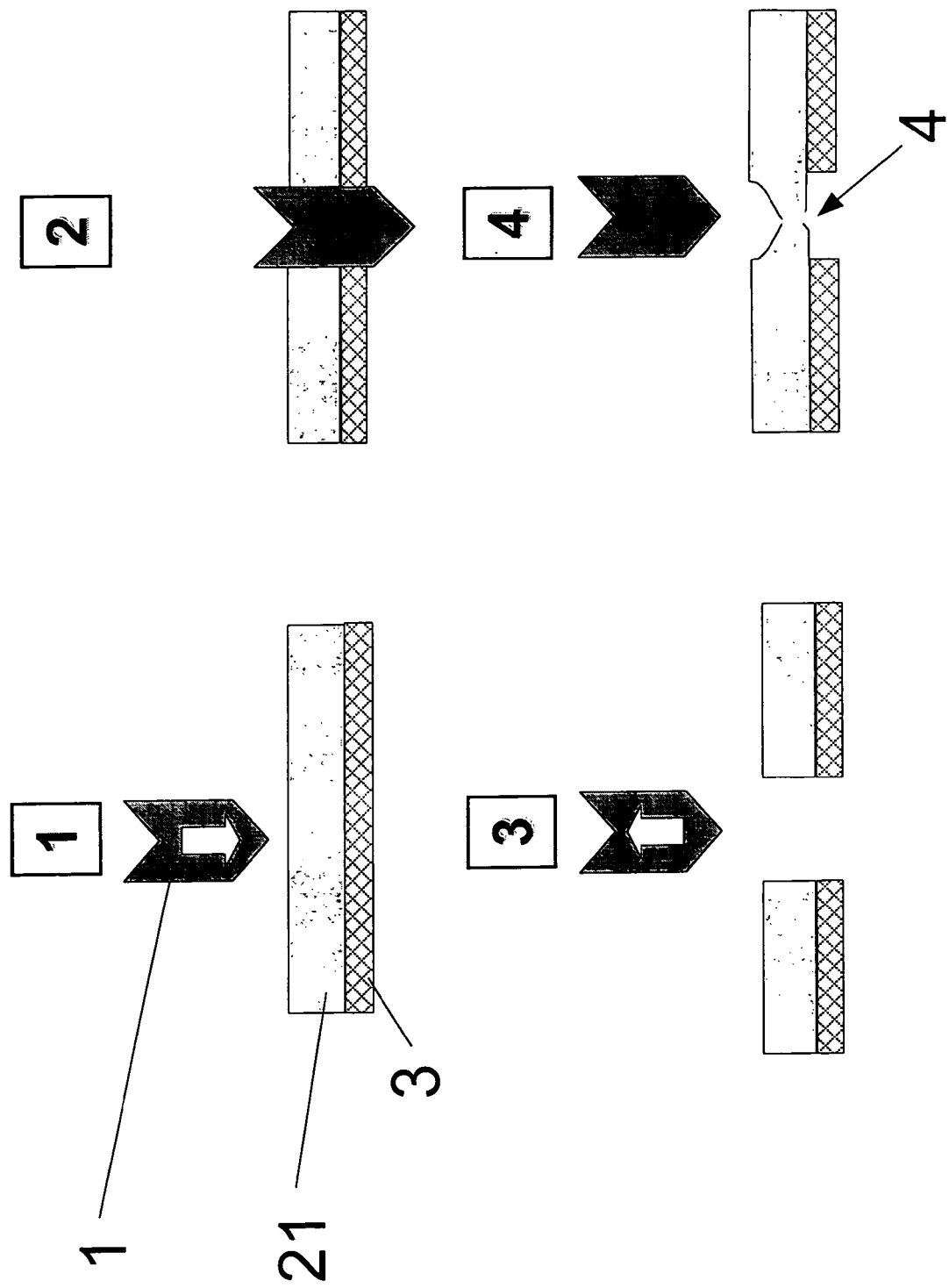
FIG. 4a depicts the slitting operation with a punching blade 1 through an adhesive transfer tape with a non-anisotropic PSA layer 21 applied to one side.
Figure 4B:
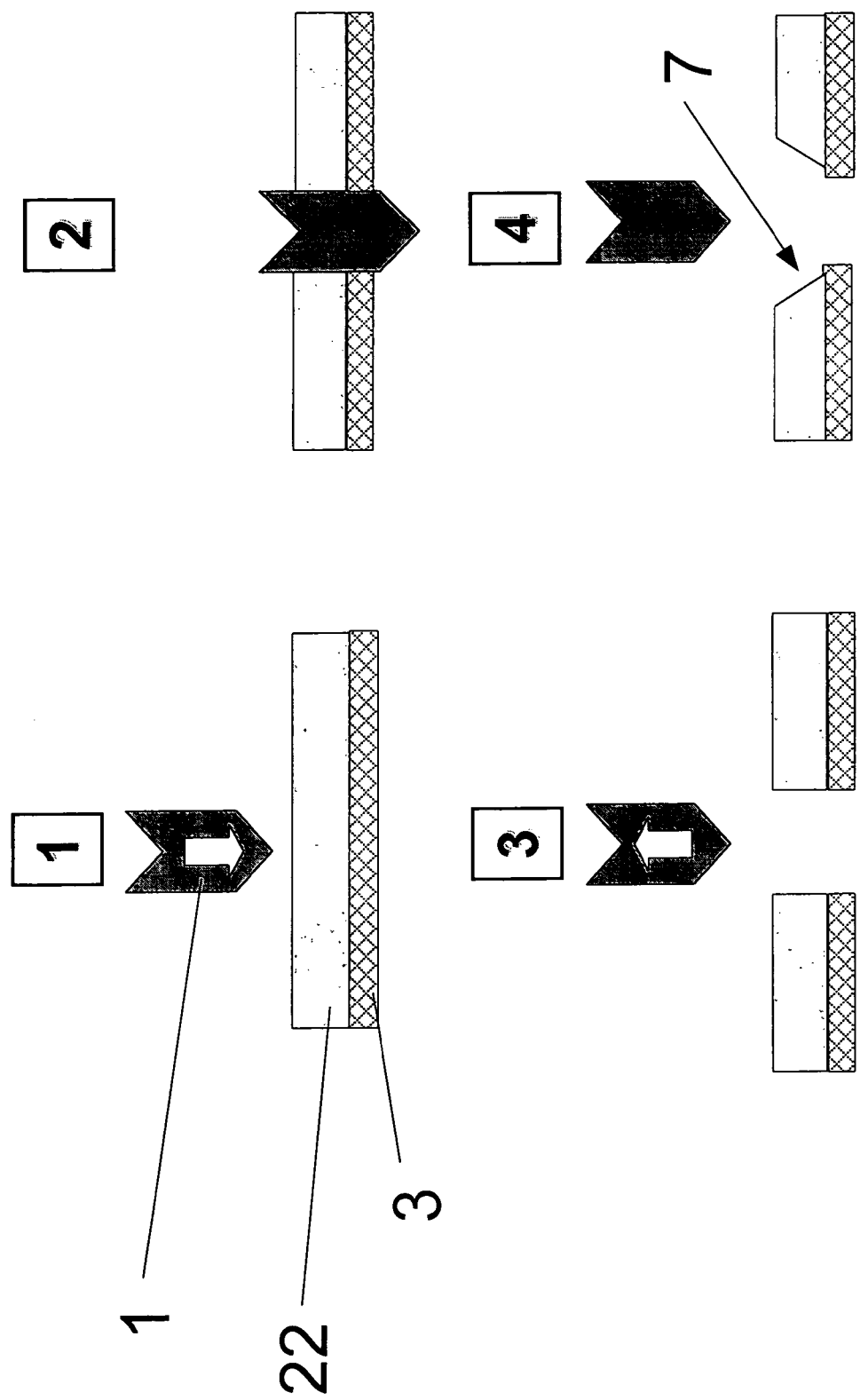
FIG. 4b shows the use of an anisotropic PSA 22 for the punching operation.

FIG. 4a depicts the slitting operation with a punching blade 1 through an adhesive transfer tape with a non-anisotropic PSA layer 21 applied to one side, while FIG. 4b shows the inventive use of an anisotropic PSA 22 for the punching operation, namely for the punching of an adhesive transfer tape with an anisotropic PSA 22. Numeral 3 designates an antiadhesive release material, e.g., siliconized release paper. In the first case (FIG. 4a, non-anisotropic PSA) the PSA of the punched product coalesces with the PSA layer of the surrounding layer after the slitting operation and the removal of the blade 1; the PSA where coalescence has taken place is designated by 4. The punched product cannot be removed, or not without destruction. Accordingly, in these cases, the punched product is frayed at the edge, and the PSA exhibits stringing.

In the case of a punching process with inventive use of the anisotropic PSA 22 (FIG. 4b) the PSA layer recedes after slitting (shrinkback, item 7). The punched product can be removed without damage from the release material 3 and can be bonded with a clean cut edge to a substrate.

Figure 5A:
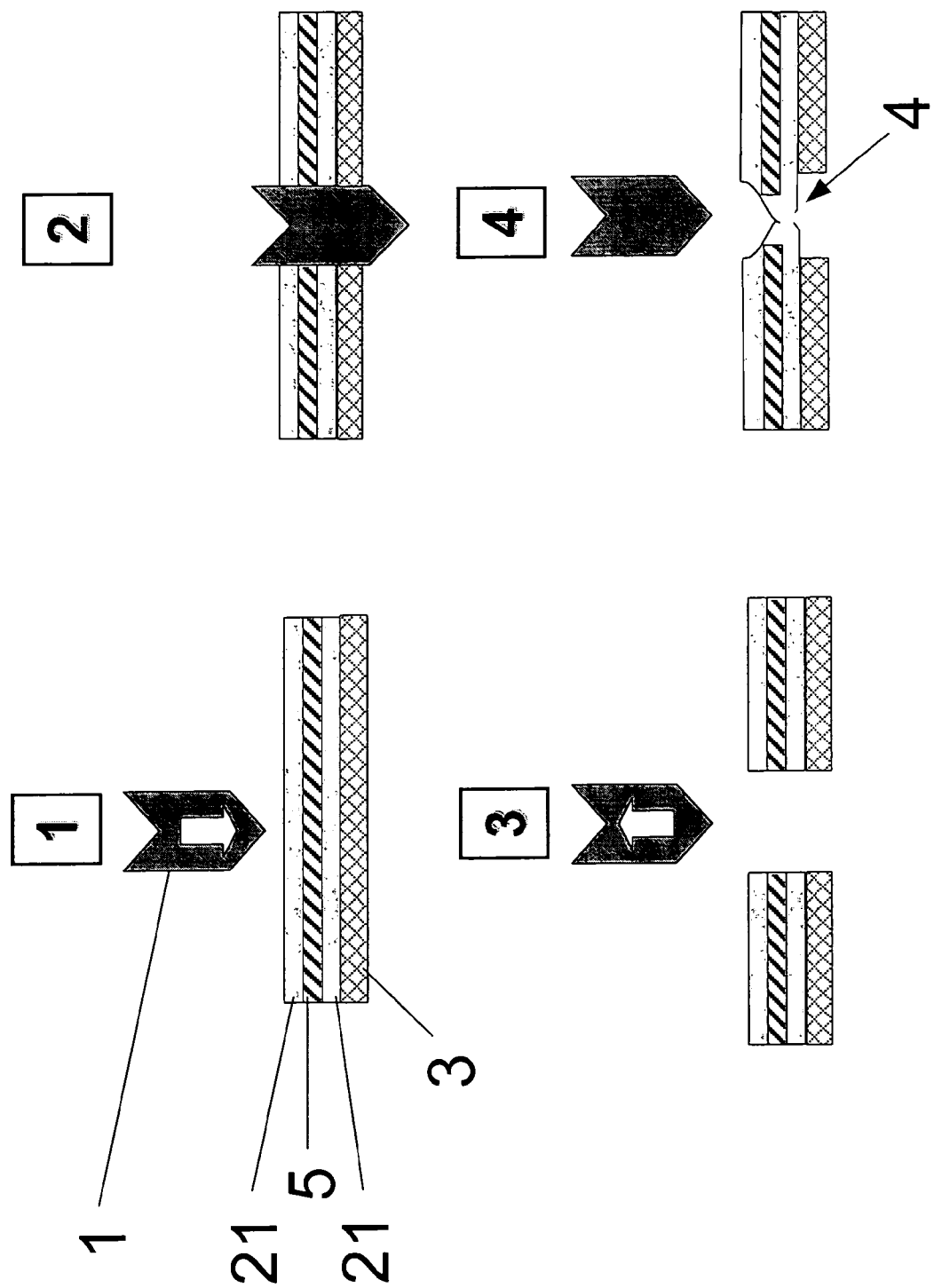
FIG. 5a shows the behavior after the slitting operation for double-sided adhesive tapes which uses non-anisotropic PSA 21.
Figure 5B:
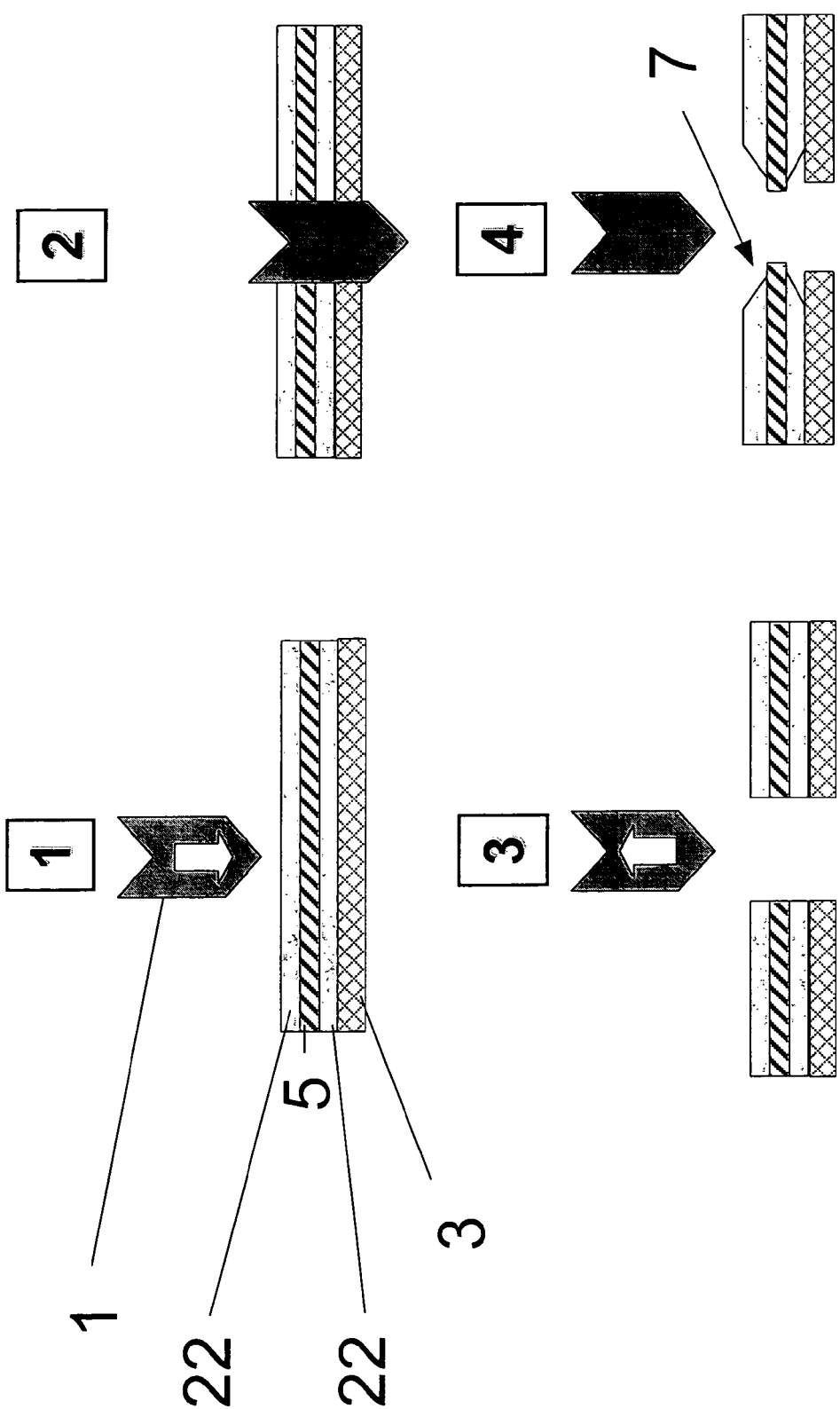
FIG. 5b shows the behavior after the slitting operation for double-sided adhesive tapes which uses anisotropic PSA 22.

FIGS. 5a and 5b show the behavior after the slitting operation for double-sided adhesive tapes (constructed from PSA layer 21 or 22, carrier 5 (film, web or the like), PSA layer 21 or 22, antiadhesive release material 3). FIG. 5a shows the case of non-anisotropic PSA 21 on a release layer 3:

After the slitting operation (position 4) the adhesive 21 coalesces (item 4). During the removal of the punched product from the release material 3, the punched product becomes damaged.

Figure 6A:
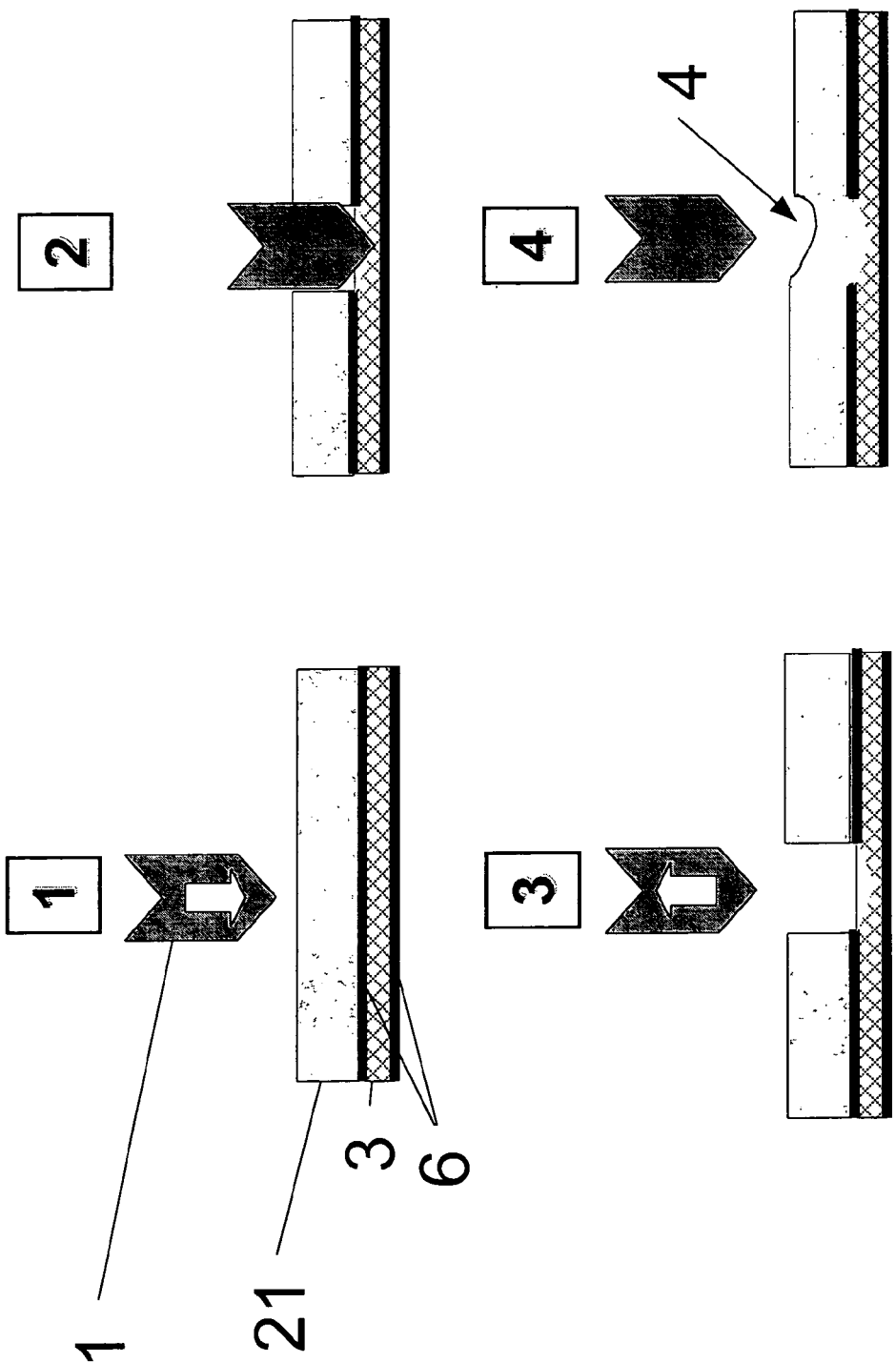
FIG. 6a shows a conventional punching operation for the kiss-cutting of adhesive transfer tapes using non-anisotropic adhesive 21 and coalescence 4 after the slitting operation.
Figure 6B:
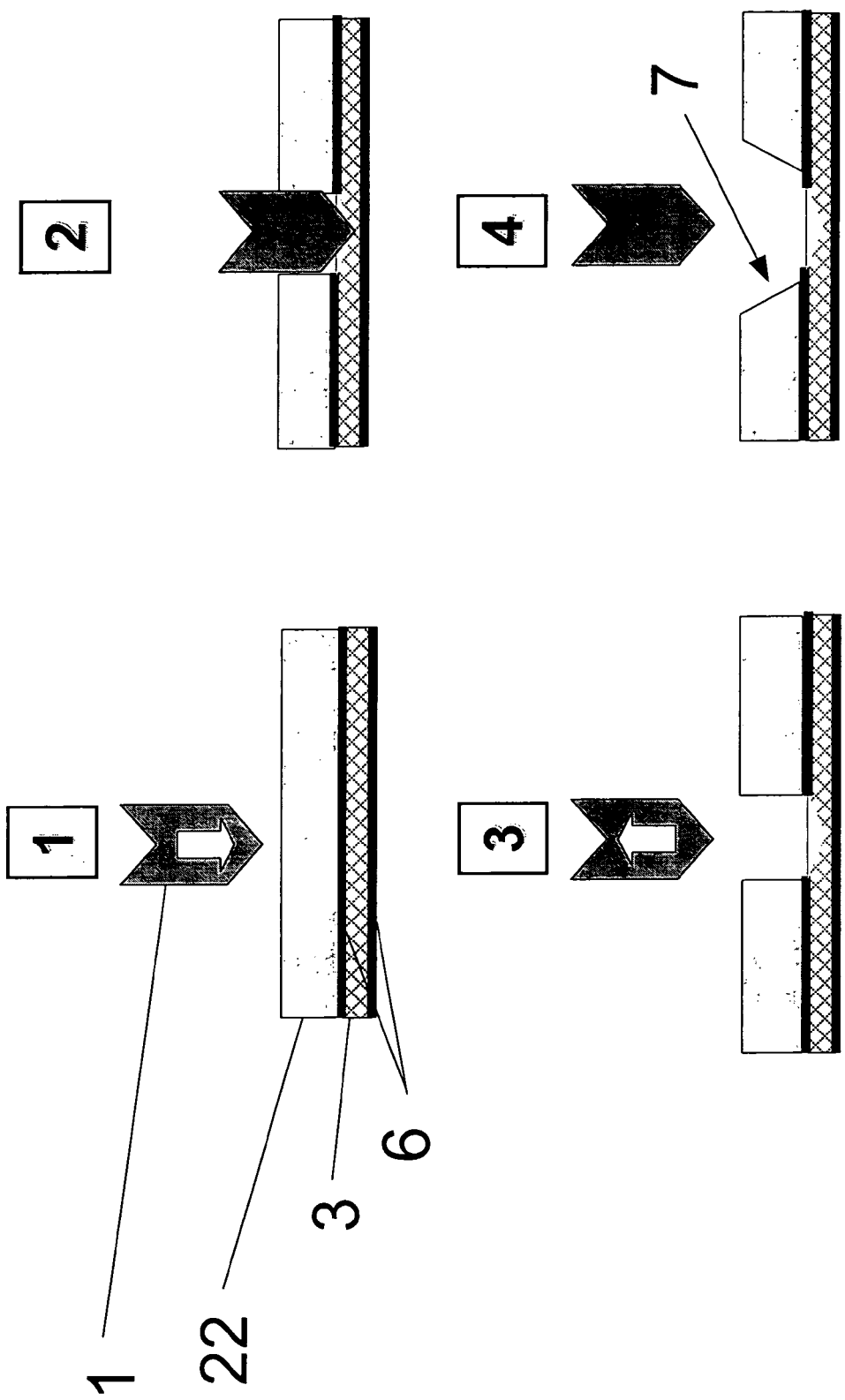
FIG. 6b shows the inventive punching operation for the kiss-cutting of adhesive transfer tapes using anisotropic adhesive 22 with no coalescence 7 after the slitting operation.
Figure 7A:
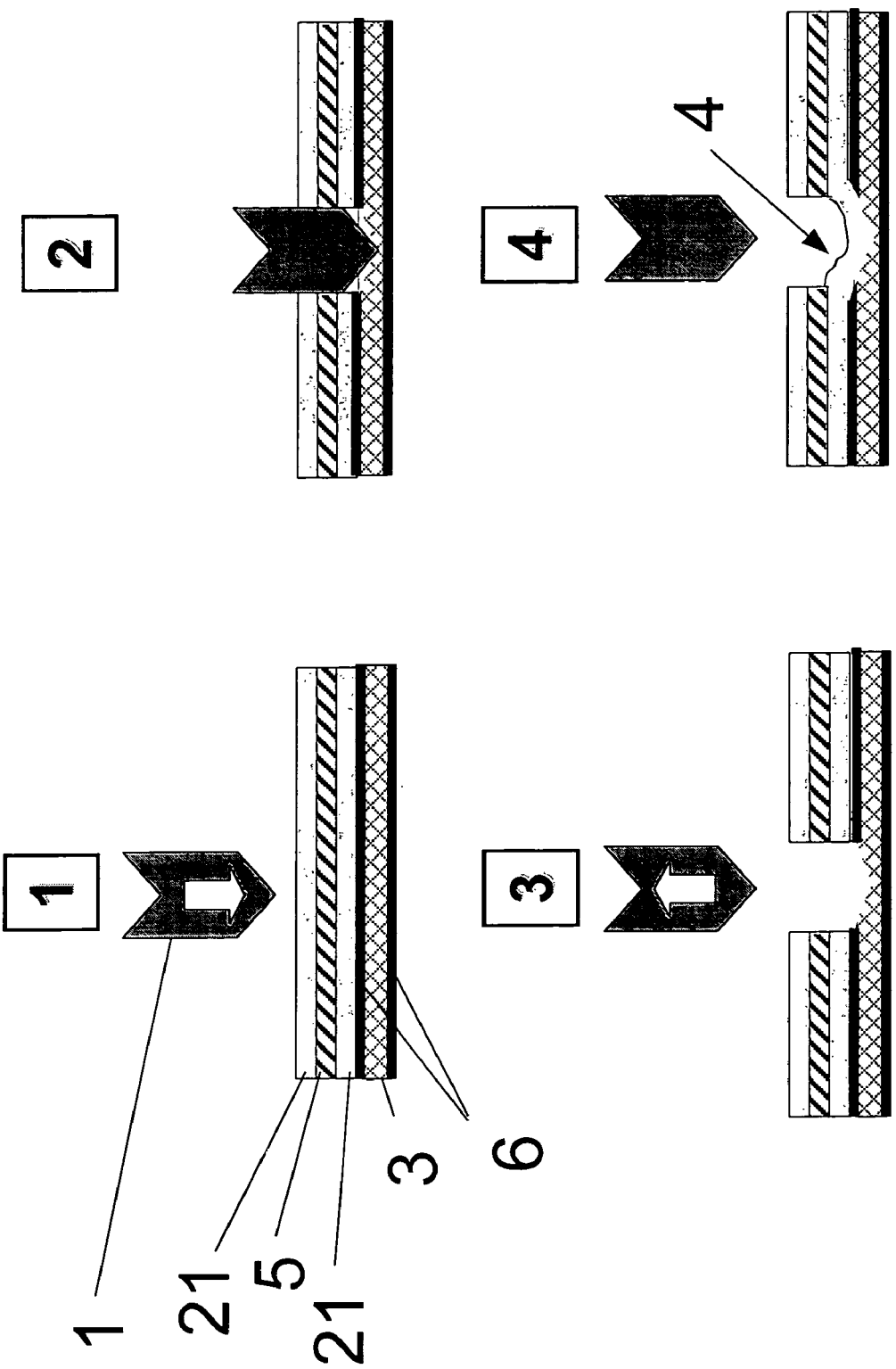
FIG. 7a shows the kiss-cutting of double-sided adhesive tapes (using non-anisotropic PSA 21) on release material 3.
Figure 7B:
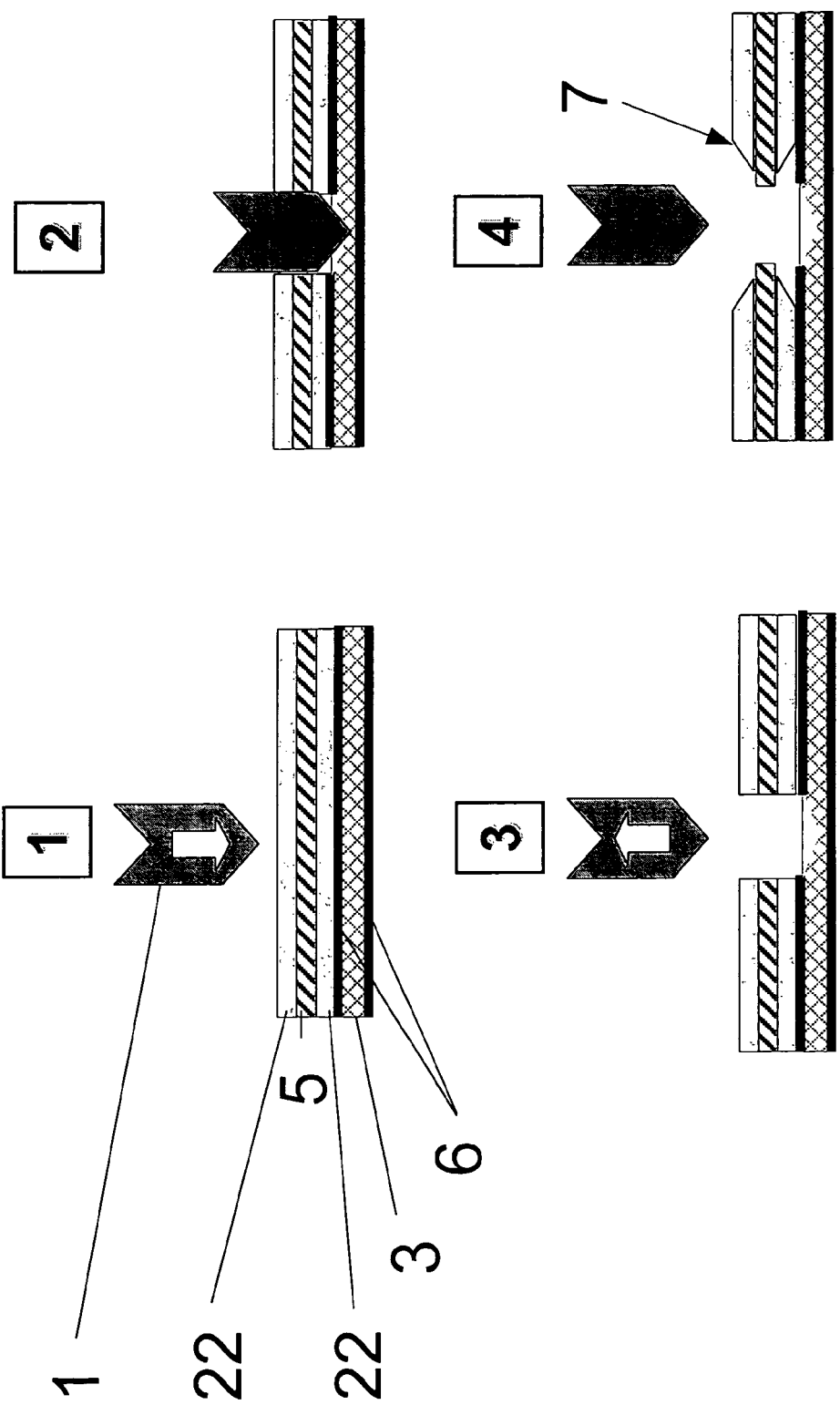
FIG. 7b shows the kiss-cutting of double-sided adhesive tapes (using anisotropic PSA 22) on release material 3.

FIG. 5b shows the same stretching operation when using anisotropic PSAs 22: after slitting with the blade 1, the PSA 22 recedes in accordance with the shrinkback 7, and coalescence of the PSA of the punched product and of the surrounding material is prevented. Correspondingly, FIGS. 6a and 6b show the conventional (6a, non-anisotropic adhesive 21, coalescence 4 after the slitting operation) and the inventive (6b, anisotropic adhesive 22, no coalescence 7) punching operation for the kiss-cutting of adhesive transfer tapes with a single-sided PSA layer 21 or 22. Where there is a release layer 3 between two layers of release material 6, the punched product can then be lifted up and possesses undamaged edges. FIGS. 7a and 7b show, accordingly, the kiss-cutting of double-sided adhesive tapes on release material 3 (FIG. 7a: non-anisotropic PSA 21, coalesces again after kiss cutting, 4;

FIG. 7b, anisotropic PSA 22, no coalescence after punching (shrinkback 7), cut is retained).

The recession is particularly pronounced in the stretching direction (MD). Advantageously, therefore, cuts are made in such a way that the angle between the stretching direction and the cut in an angle range between 0° (parallel extent) and 90° is chosen to be as large as possible, the angle preferably being 90°, i.e., the cut extending perpendicular to the stretching direction (and thus in the transverse direction, CD). For cuts in the stretching direction as well, however, a markedly reduced flow behavior can be found as compared with non-anisotropic PSAs.

A targeted influence can be had on the recession behavior of the PSA layer in the case of incisions or cuts right through with single-coated or double-coated carrier materials, by way of the anchoring of the PSA layer on the carrier material. Using corona or flameproof treatment it is possible to achieve a marked reduction in shrinkback on BOPP and PET carrier films.

Decisive parameters when setting the shrinkback behavior are the operating conditions of extrusion. These conditions include in particular the temperature of the coating roller, the temperature of the PSA during processing, the time before crosslinking, the stretching ratio during coating, and the coating speed.

The recession behavior of the PSA layer was observed both with resin-free acrylic hotmelts and with resin-blended acrylic hotmelts. The invention is particularly significant for resin-blended acrylic hotmelts, since these systems display a significantly more pronounced flow behavior than straight acrylics, owing to their inherently lower viscosity as compared with straight acrylics.

In this way, the positive properties of hotmelt pressure sensitive adhesives can be utilized in punched products without the greater flow behavior having deleterious consequences for the punching operation or for the punched products produced.

The invention claimed is:

1. A method of making a punched product which comprises the steps of:
    (a) applying an anisotropic pressure sensitive adhesive having linear polymer chains to one or both sides of a carrier material with an extrusion die to form a single coated or double coated carrier material such that the linear polymer chains are oriented on the carrier material and crosslinking the anisotropic pressure sensitive adhesive by irradiation with electron beams and freezing the orientation of the polymer chains on the carrier material, wherein said anisotropic pressure sensitive adhesive:
        (i) is obtainable by a free-radical addition polymerization;
        (ii) is based of at least 65% by weight of at least one acrylic monomer from the group of compounds selected from the group consisting of:

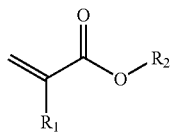

where $R_1$ is H or $CH_3$ and the radical $R_2$ is selected from the group consisting of H, $CH_3$ and branched or unbranched, saturated alkyl groups having 2 to 20 carbon atoms;
        (iii) has a weight-average molecular weight, as measured by gel permeation chromatography, of at least 650,000;
        (iv) when applied to a carrier, possesses a preferential direction, the refractive index measured in the preferential direction, $n_{MD}$, being greater than the refractive index measured in a direction perpendicular to the preferential direction, $n_{CD}$, and the difference $\Delta n = n_{MD} - n_{CD}$ being at least $1 \cdot 10^{-5}$; and
        (v) exhibits shrinkback;
    (b) punching or partial-punching of said single or double coated material to form said punched product wherein the anisotropic pressure sensitive adhesive is slit during the punching or partial-punching and the anisotropic pressure sensitive adhesive at the slit does not coalesce after the punching or partial-punching.

2. The method of claim 1, wherein $R_2$ is a branched or unbranched, saturated alkyl groups having 4 to 9 carbon atoms.

3. The method of claim 1, wherein up to 35% by weight of the anisotropic pressure sensitive adhesive is based on comonomers in the form of vinyl compounds.

4. The method of claim 3, wherein the vinyl compounds are selected from the group consisting of vinyl esters, vinyl halides, vinylidene halides and nitriles of ethylenically unsaturated hydrocarbons.

5. The method of claim 3, wherein the vinyl compound is an acrylic compound.

6. The method of claim 5, wherein the acrylic compound is selected from the group consisting of acrylic acid, 2-ethylhexylacrylate, methyl acrylate, N-tert-butylacrylamide, butyl acrylate and mixtures thereof.

7. The method of claim 6, wherein the acrylic compound consists of a mixture of acrylic acid and 2-ethylhexyl acrylate.

8. The method of claim 6, wherein the acrylic compound consists of a mixture of acrylic acid, 2-ethylhexyl acrylate and methyl acrylate.

9. The method of claim 6, wherein the acrylic compound consists of a mixture of acrylic acid, 2-ethylhexyl acrylate, methyl acrylate and N-tert-butylacrylamide.

10. The method of claim 6, wherein the acrylic compound consists of a mixture of acrylic acid, 2-ethylhexyl acrylate, butyl acrylate and methyl acrylate.

11. The method of claim 10, wherein the weight-average molecular weight, as measured by gel permeation chromatography, is between 650,000 and 2,000,000 g/mol.

12. The method of claim 11, wherein the weight-average molecular weight, as measured by gel permeation chromatography, is between 700,000 and 1,000,000 g/mol.

13. The method of claim 1, wherein the free-radical addition polymerization is comprised of the following steps:
    (ia) polymerization of a mixture comprising at least one vinyl-, acrylic- or methacrylic-based monomer or a combination of these monomers, the weight-average molecular weight, as measured by gel permeation chromatography, of the resulting polymer composition being above 650,000;
    (ib) subsequent extrusion coating of the polymer composition; and
    (ic) subsequent crosslinking of the polymer composition on the carrier by irradiation with electron beams.

14. A punched product produced by the method of any one of claims 1-6 and 11-13.

15. A punched product produced by the method of any one of claims 7-10.

16. A process of preparing an adhesive tape comprising the steps of die coating one or both sides of a carrier material with an anisotropic pressure sensitive adhesive having linear polymer chains and orienting the polymer chains on the carrier material and crosslinking the anisotropic pressure sensitive adhesive by irradiation with electron beams and freezing the orientation of the polymer chains on the carrier material wherein the anisotropic pressure sensitive adhesive
(i) is obtainable by a free-radical addition polymerization;
(ii) is based of at least 65% by weight of at least one acrylic monomer from the group of compounds selected from the group consisting of:

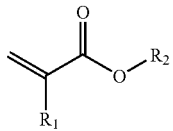

where $R_1$ is H or $CH_3$ and the radical $R_2$ is selected from the group consisting of H, $CH_3$ and branched or unbranched, saturated alkyl groups having 2 to 20 carbon atoms;
(iii) has a weight-average molecular weight, as measured by gel permeation chromatography, of at least 650,000; and
(iv) when applied to a carrier, possesses a preferential direction, the refractive index measured in the preferential direction, $n_{MD}$, being greater than the refractive index measured in a direction perpendicular to the preferential direction, $n_{CD}$, and the difference $\Delta n = n_{MD} - n_{CD}$ being at least $1 \cdot 10^{-5}$.

* * * * *